United States Patent
Weller et al.

(10) Patent No.: US 8,827,790 B2
(45) Date of Patent: *Sep. 9, 2014

(54) METHOD FOR PLAYING MULTI-LEVEL GAMES OF CHANCE

(75) Inventors: Scott Weller, Salem, MA (US); Matthew Ross, Natick, MA (US)

(73) Assignee: Scientific Games Holdings Limited, Ballymahon, Co. Longford (IE)

( * ) Notice: Subject to any disclaimer, the term of this patent is extended or adjusted under 35 U.S.C. 154(b) by 1415 days.

This patent is subject to a terminal disclaimer.

(21) Appl. No.: 12/049,635

(22) Filed: Mar. 17, 2008

(65) Prior Publication Data

US 2008/0280665 A1 Nov. 13, 2008

Related U.S. Application Data

(63) Continuation of application No. 11/832,071, filed on Aug. 1, 2007, now Pat. No. 8,696,433.

(60) Provisional application No. 60/835,142, filed on Aug. 1, 2006.

(51) Int. Cl.
*G07F 17/32* (2006.01)
*G06Q 30/02* (2012.01)

(52) U.S. Cl.
CPC ............ *G07F 17/32* (2013.01); *G07F 17/3244* (2013.01); *G06Q 30/02* (2013.01); *G07F 17/3267* (2013.01); *G07F 17/3258* (2013.01); *G07F 17/3276* (2013.01)
USPC ............................................... 463/16; 463/20

(58) Field of Classification Search
USPC ..................................... 463/9, 16, 17, 20, 25
See application file for complete search history.

(56) References Cited

U.S. PATENT DOCUMENTS

| | | |
|---|---|---|
| 2,544,961 A | 3/1951 | Kemp |
| 4,215,864 A | 8/1980 | Nichols |
| 4,494,197 A | 1/1985 | Troy et al. |
| 4,582,324 A | 4/1986 | Koza et al. |
| 4,679,789 A | 7/1987 | Okada |
| 4,689,742 A | 8/1987 | Troy et al. |
| 4,725,079 A | 2/1988 | Koza et al. |
| 4,764,666 A | 8/1988 | Bergeron |
| 4,856,787 A | 8/1989 | Itkis |

(Continued)

FOREIGN PATENT DOCUMENTS

| | | |
|---|---|---|
| EP | 1746550 A2 | 1/2007 |
| EP | 1762990 A2 | 3/2007 |

(Continued)

OTHER PUBLICATIONS

Rules of Pai Gow Poker. Casino City. Dec. 3, 2000. Online: http://web.archive.org/web/20001203170300/http://www.casinocity.com/rule/paigow.htm.

(Continued)

*Primary Examiner* — William Brewster
*Assistant Examiner* — Jason Skaarup
(74) *Attorney, Agent, or Firm* — Dority & Manning, P.A.

(57) ABSTRACT

A method for playing a multi-level game of chance wherein players can advance to the next level with a win. As the game progresses through levels, non-winning players are eliminated and winning players are segregated by type of win. In general, each level provides greater winnings. In another example game format, a progressive jackpot may also be offered.

19 Claims, 10 Drawing Sheets

(56) References Cited

U.S. PATENT DOCUMENTS

| | | |
|---|---|---|
| 4,882,473 A | 11/1989 | Bergeron et al. |
| 4,922,522 A | 5/1990 | Scanlon |
| 5,158,293 A | 10/1992 | Mullins |
| 5,324,035 A | 6/1994 | Morris et al. |
| 5,351,970 A | 10/1994 | Fioretti |
| 5,373,440 A | 12/1994 | Cohen |
| 5,377,975 A | 1/1995 | Clapper, Jr. |
| 5,398,932 A | 3/1995 | Eberhardt et al. |
| 5,429,361 A | 7/1995 | Raven |
| 5,518,253 A | 5/1996 | Pocock et al. |
| 5,569,082 A | 10/1996 | Kaye |
| 5,586,937 A | 12/1996 | Menashe |
| 5,611,729 A | 3/1997 | Schumacher |
| 5,628,684 A | 5/1997 | Bouedec |
| 5,645,485 A | 7/1997 | Clapper, Jr. |
| 5,653,635 A | 8/1997 | Breeding |
| 5,709,603 A | 1/1998 | Kaye |
| 5,722,891 A | 3/1998 | Inoue |
| 5,749,784 A | 5/1998 | Clapper, Jr. |
| 5,768,382 A | 6/1998 | Schneier et al. |
| 5,772,511 A | 6/1998 | Smeltzer |
| 5,779,549 A | 7/1998 | Walker et al. |
| 5,788,573 A | 8/1998 | Baerlocher et al. |
| 5,791,990 A | 8/1998 | Schroeder et al. |
| 5,791,991 A | 8/1998 | Small |
| 5,810,664 A | 9/1998 | Clapper, Jr. |
| 5,816,918 A | 10/1998 | Kelly et al. |
| 5,823,873 A | 10/1998 | Moody |
| 5,823,874 A | 10/1998 | Adams |
| 5,830,069 A | 11/1998 | Soltesz et al. |
| 5,848,932 A | 12/1998 | Adams |
| 5,860,653 A | 1/1999 | Jacobs |
| 5,871,398 A | 2/1999 | Schneier et al. |
| 5,882,258 A | 3/1999 | Kelly et al. |
| 5,887,906 A | 3/1999 | Sultan |
| 5,928,082 A | 7/1999 | Clapper, Jr. et al. |
| 5,944,606 A | 8/1999 | Gerow |
| 5,954,582 A | 9/1999 | Zach et al. |
| 5,980,385 A | 11/1999 | Clapper |
| 5,996,997 A | 12/1999 | Kamille |
| 6,007,426 A | 12/1999 | Kelly et al. |
| 6,012,983 A | 1/2000 | Walker et al. |
| 6,015,344 A | 1/2000 | Kelly et al. |
| 6,024,640 A | 2/2000 | Walker et al. |
| 6,028,920 A | 2/2000 | Carson |
| 6,044,135 A | 3/2000 | Katz |
| 6,048,269 A | 4/2000 | Burns et al. |
| 6,056,289 A | 5/2000 | Clapper |
| 6,059,289 A | 5/2000 | Vancura |
| 6,062,980 A * | 5/2000 | Luciano .......................... 463/20 |
| 6,077,163 A | 6/2000 | Walker et al. |
| 6,106,393 A | 8/2000 | Sunaga et al. |
| 6,113,495 A | 9/2000 | Walker et al. |
| 6,146,272 A | 11/2000 | Walker et al. |
| 6,152,823 A | 11/2000 | Lacoste et al. |
| 6,159,097 A | 12/2000 | Gura |
| 6,162,121 A | 12/2000 | Morro et al. |
| 6,168,521 B1 | 1/2001 | Luciano et al. |
| 6,173,267 B1 | 1/2001 | Cairns |
| 6,179,711 B1 | 1/2001 | Yoseloff |
| 6,186,892 B1 | 2/2001 | Frank et al. |
| 6,203,011 B1 | 3/2001 | Nulph et al. |
| 6,203,427 B1 | 3/2001 | Walker et al. |
| 6,236,900 B1 | 5/2001 | Geiger |
| 6,241,606 B1 | 6/2001 | Riendeau et al. |
| 6,244,958 B1 | 6/2001 | Acres et al. |
| 6,251,017 B1 | 6/2001 | Leason et al. |
| 6,270,406 B1 | 8/2001 | Sultan |
| 6,273,817 B1 | 8/2001 | Sultan |
| 6,279,911 B1 | 8/2001 | Cherry |
| 6,280,325 B1 | 8/2001 | Fisk |
| RE37,371 E | 9/2001 | Gerow |
| 6,283,855 B1 | 9/2001 | Bingham |
| 6,302,793 B1 | 10/2001 | Fertitta et al. |
| 6,309,298 B1 | 10/2001 | Gerow |
| 6,311,976 B1 | 11/2001 | Yoseloff et al. |
| 6,312,334 B1 * | 11/2001 | Yoseloff .......................... 463/25 |
| 6,358,151 B1 | 3/2002 | Enzminger et al. |
| 6,364,765 B1 | 4/2002 | Walker et al. |
| 6,364,766 B1 | 4/2002 | Anderson |
| 6,368,214 B1 | 4/2002 | Luciano |
| 6,368,218 B2 | 4/2002 | Angell, Jr. |
| 6,371,852 B1 | 4/2002 | Acres |
| 6,375,567 B1 | 4/2002 | Acres |
| 6,390,921 B1 | 5/2002 | Busch et al. |
| 6,394,902 B1 | 5/2002 | Glavich et al. |
| 6,402,614 B1 | 6/2002 | Schneier et al. |
| 6,439,995 B1 | 8/2002 | Hughs-Baird et al. |
| 6,471,208 B2 | 10/2002 | Yoseloff et al. |
| 6,488,280 B1 | 12/2002 | Katz et al. |
| 6,514,144 B2 | 2/2003 | Riendeau et al. |
| 6,523,829 B1 | 2/2003 | Walker et al. |
| 6,527,175 B1 | 3/2003 | Dietz et al. |
| 6,540,230 B1 | 4/2003 | Walker et al. |
| 6,565,084 B1 | 5/2003 | Katz et al. |
| 6,572,106 B2 | 6/2003 | Alexoff et al. |
| 6,572,107 B1 | 6/2003 | Walker et al. |
| 6,575,832 B1 | 6/2003 | Manfredi et al. |
| 6,582,307 B2 | 6/2003 | Webb |
| 6,582,310 B1 | 6/2003 | Walker et al. |
| 6,588,747 B1 | 7/2003 | Seelig |
| 6,599,187 B2 | 7/2003 | Gerow |
| 6,599,192 B1 | 7/2003 | Baerlocher et al. |
| 6,607,439 B2 | 8/2003 | Schneier et al. |
| 6,612,501 B1 | 9/2003 | Woll et al. |
| 6,612,574 B1 | 9/2003 | Cole et al. |
| 6,612,927 B1 * | 9/2003 | Slomiany et al. .............. 463/16 |
| 6,619,660 B2 | 9/2003 | Schaefer et al. |
| 6,620,046 B2 | 9/2003 | Rowe |
| 6,625,578 B2 | 9/2003 | Spaur et al. |
| 6,645,074 B2 | 11/2003 | Thomas et al. |
| 6,645,075 B1 | 11/2003 | Gatto |
| 6,656,042 B2 | 12/2003 | Reiss et al. |
| 6,663,105 B1 | 12/2003 | Sullivan et al. |
| 6,676,126 B1 | 1/2004 | Walker et al. |
| 6,679,497 B2 | 1/2004 | Walker et al. |
| 6,681,995 B2 | 1/2004 | Sukeda et al. |
| 6,682,419 B2 | 1/2004 | Webb et al. |
| D486,869 S | 2/2004 | Webb et al. |
| 6,685,561 B2 | 2/2004 | Anderson et al. |
| 6,692,353 B2 | 2/2004 | Walker et al. |
| 6,705,944 B2 | 3/2004 | Luciano |
| 6,716,103 B1 | 4/2004 | Eck et al. |
| 6,719,631 B1 | 4/2004 | Tulley et al. |
| 6,729,956 B2 | 5/2004 | Wolf et al. |
| 6,733,385 B1 | 5/2004 | Enzminger et al. |
| 6,736,324 B2 | 5/2004 | Behm |
| 6,749,198 B2 | 6/2004 | Katz et al. |
| 6,761,633 B2 | 7/2004 | Riendeau et al. |
| 6,786,824 B2 | 9/2004 | Cannon |
| 6,811,484 B2 | 11/2004 | Katz et al. |
| 6,824,467 B2 | 11/2004 | Schlottmann et al. |
| 6,843,724 B2 | 1/2005 | Walker et al. |
| 6,852,031 B1 | 2/2005 | Rowe et al. |
| 6,855,052 B2 | 2/2005 | Weiss et al. |
| 6,896,619 B2 | 5/2005 | Baltz |
| 6,899,622 B2 | 5/2005 | Lind et al. |
| 6,910,968 B2 | 6/2005 | Nassef et al. |
| 6,913,534 B2 | 7/2005 | DeFrees-Parrott |
| 6,918,589 B2 | 7/2005 | Thibault |
| 6,929,544 B2 | 8/2005 | Osterer |
| 6,934,846 B2 | 8/2005 | Szrek |
| 6,942,570 B2 | 9/2005 | Schneier et al. |
| 6,969,319 B2 | 11/2005 | Rowe et al. |
| 7,008,317 B2 | 3/2006 | Cote et al. |
| 7,008,318 B2 | 3/2006 | Schneier et al. |
| 7,024,375 B2 | 4/2006 | Chau |
| 7,073,720 B2 | 7/2006 | Behm |
| 7,112,135 B2 | 9/2006 | Anderson |
| 7,118,478 B2 | 10/2006 | Fayter et al. |
| 7,163,459 B2 | 1/2007 | Tanskanen et al. |

(56) References Cited

U.S. PATENT DOCUMENTS

| | | |
|---|---|---|
| 7,172,506 B2 | 2/2007 | Baerlocher et al. |
| 7,179,168 B1 | 2/2007 | Tulley et al. |
| 7,186,180 B2 | 3/2007 | Lathrop |
| 7,213,811 B2 | 5/2007 | Bozeman |
| 7,275,990 B2 | 10/2007 | Walker et al. |
| 7,285,045 B2 | 10/2007 | Schneier et al. |
| 7,294,058 B1 | 11/2007 | Slomiany et al. |
| 7,303,468 B2 | 12/2007 | Schneier et al. |
| 7,303,470 B2 | 12/2007 | George et al. |
| 7,311,599 B2 | 12/2007 | Knapp |
| 7,357,393 B2 | 4/2008 | Finocchio |
| 7,416,484 B1 | 8/2008 | Nelson |
| 2001/0046891 A1 | 11/2001 | Acres |
| 2001/0049305 A1 | 12/2001 | Riendeau et al. |
| 2002/0010015 A1 | 1/2002 | Acres |
| 2002/0013167 A1 | 1/2002 | Spaur et al. |
| 2002/0039923 A1 | 4/2002 | Cannon et al. |
| 2002/0042300 A2 | 4/2002 | Acres et al. |
| 2002/0052229 A1 | 5/2002 | Halliburton et al. |
| 2002/0061778 A1 | 5/2002 | Acres |
| 2002/0077173 A1 | 6/2002 | Luciano et al. |
| 2002/0090986 A1 | 7/2002 | Cote et al. |
| 2002/0090987 A1 | 7/2002 | Walker et al. |
| 2002/0093190 A1 | 7/2002 | Katz |
| 2002/0098882 A1 | 7/2002 | Lind et al. |
| 2002/0107072 A1 | 8/2002 | Giobbi et al. |
| 2002/0147040 A1 | 10/2002 | Walker et al. |
| 2002/0152120 A1 | 10/2002 | Howington et al. |
| 2002/0155885 A1 | 10/2002 | Shvili |
| 2002/0169018 A1 | 11/2002 | Schneier et al. |
| 2002/0187827 A1 | 12/2002 | Blankstein |
| 2002/0193158 A1 | 12/2002 | Weiss et al. |
| 2002/0198038 A1 | 12/2002 | Adams |
| 2003/0013531 A1 | 1/2003 | Rowe et al. |
| 2003/0027628 A1 | 2/2003 | Luciano |
| 2003/0032473 A1 | 2/2003 | Rowe et al. |
| 2003/0032476 A1 | 2/2003 | Walker et al. |
| 2003/0045340 A1 | 3/2003 | Roberts |
| 2003/0047869 A1 | 3/2003 | Walker et al. |
| 2003/0060257 A1 | 3/2003 | Katz et al. |
| 2003/0060261 A1 | 3/2003 | Katz et al. |
| 2003/0069068 A1 | 4/2003 | Kaminkow |
| 2003/0080508 A1 | 5/2003 | Thibault |
| 2003/0102625 A1 | 6/2003 | Katz et al. |
| 2003/0114217 A1 | 6/2003 | Walker et al. |
| 2003/0119581 A1 | 6/2003 | Cannon et al. |
| 2003/0139214 A1 | 7/2003 | Wolf et al. |
| 2003/0155715 A1 | 8/2003 | Walker et al. |
| 2003/0157977 A1 | 8/2003 | Thomas et al. |
| 2003/0171986 A1 | 9/2003 | Itkis |
| 2003/0176210 A1 | 9/2003 | Vancura et al. |
| 2003/0176212 A1 | 9/2003 | Schlottmann et al. |
| 2003/0184012 A1 | 10/2003 | Green |
| 2003/0186739 A1 | 10/2003 | Paulsen et al. |
| 2003/0195841 A1 | 10/2003 | Ginsberg et al. |
| 2003/0199318 A1 | 10/2003 | Nassef et al. |
| 2003/0218303 A1 | 11/2003 | Walker et al. |
| 2003/0220138 A1 | 11/2003 | Walker et al. |
| 2003/0236110 A1 * | 12/2003 | Beaulieu et al. .................. 463/1 |
| 2004/0025190 A1 | 2/2004 | McCalla et al. |
| 2004/0036212 A1 | 2/2004 | Walker et al. |
| 2004/0038723 A1 | 2/2004 | Schneier et al. |
| 2004/0051240 A1 | 3/2004 | Adams |
| 2004/0053683 A1 | 3/2004 | Hartl et al. |
| 2004/0063484 A1 | 4/2004 | Dreaper et al. |
| 2004/0092307 A1 | 5/2004 | George et al. |
| 2004/0102238 A1 | 5/2004 | Taylor |
| 2004/0102239 A1 | 5/2004 | Samila |
| 2004/0127279 A1 | 7/2004 | Gatto et al. |
| 2004/0133472 A1 | 7/2004 | Leason et al. |
| 2004/0142741 A1 | 7/2004 | Walker et al. |
| 2004/0147308 A1 | 7/2004 | Walker et al. |
| 2004/0152504 A1 | 8/2004 | Herrmann et al. |
| 2004/0152510 A1 | 8/2004 | Herrmann |
| 2004/0180722 A1 | 9/2004 | Giobbi et al. |
| 2004/0185930 A1 | 9/2004 | Thomas et al. |
| 2004/0204222 A1 | 10/2004 | Roberts |
| 2004/0214628 A1 | 10/2004 | Boyd et al. |
| 2004/0229671 A1 | 11/2004 | Stronach et al. |
| 2004/0259629 A1 | 12/2004 | Michaelson et al. |
| 2004/0259631 A1 | 12/2004 | Katz et al. |
| 2005/0037841 A1 | 2/2005 | de Waal |
| 2005/0049042 A1 | 3/2005 | Walker et al. |
| 2005/0075158 A1 | 4/2005 | Walker et al. |
| 2005/0090314 A1 | 4/2005 | Nassef, Jr. et al. |
| 2005/0092839 A1 | 5/2005 | Oram |
| 2005/0124407 A1 | 6/2005 | Rowe et al. |
| 2005/0164779 A1 | 7/2005 | Okuniewicz |
| 2005/0170881 A1 | 8/2005 | Muskin |
| 2005/0187005 A1 | 8/2005 | Rose et al. |
| 2005/0258596 A1 | 11/2005 | Such |
| 2005/0282619 A1 | 12/2005 | Vancura et al. |
| 2005/0282626 A1 | 12/2005 | Manfredi et al. |
| 2005/0288088 A1 | 12/2005 | Englman et al. |
| 2006/0025219 A1 | 2/2006 | Nassef, Jr. et al. |
| 2006/0035696 A1 | 2/2006 | Walker et al. |
| 2006/0036450 A1 | 2/2006 | Nassef, Jr. et al. |
| 2006/0041586 A1 | 2/2006 | Nassef, Jr. et al. |
| 2006/0068893 A1 | 3/2006 | Jaffe et al. |
| 2006/0073870 A1 * | 4/2006 | Cannon ........................ 463/17 |
| 2006/0073884 A1 | 4/2006 | Walker et al. |
| 2006/0089194 A1 | 4/2006 | Joshi et al. |
| 2006/0148562 A1 | 7/2006 | Walker et al. |
| 2006/0194631 A1 | 8/2006 | Rowe et al. |
| 2006/0205511 A1 | 9/2006 | Thomas et al. |
| 2006/0247035 A1 | 11/2006 | Rowe et al. |
| 2007/0054729 A1 | 3/2007 | Hornik et al. |
| 2007/0060261 A1 | 3/2007 | Gomez et al. |
| 2007/0060274 A1 | 3/2007 | Rowe et al. |
| 2007/0060317 A1 | 3/2007 | Martin et al. |
| 2007/0060329 A1 | 3/2007 | Martin et al. |
| 2007/0060330 A1 | 3/2007 | Martin et al. |
| 2007/0060331 A1 | 3/2007 | Martin et al. |
| 2007/0060369 A1 | 3/2007 | Martin et al. |
| 2007/0087834 A1 | 4/2007 | Moser et al. |
| 2007/0167216 A1 | 7/2007 | Walker et al. |
| 2007/0173322 A1 | 7/2007 | Swamy et al. |
| 2007/0265062 A1 | 11/2007 | Thomas et al. |
| 2008/0032763 A1 | 2/2008 | Giobbi et al. |
| 2008/0039171 A1 | 2/2008 | Slomiany et al. |
| 2008/0039173 A1 | 2/2008 | Walther et al. |
| 2008/0287176 A1 | 11/2008 | Bennett |

FOREIGN PATENT DOCUMENTS

| | | |
|---|---|---|
| EP | 1833014 A1 | 9/2007 |
| WO | WO 91/06931 | 5/1991 |
| WO | WO 97/37737 A1 | 10/1997 |
| WO | WO 99/10057 A1 | 3/1999 |
| WO | WO 99/16519 A1 | 4/1999 |
| WO | WO 00/43087 A1 | 7/2000 |
| WO | WO 00/69535 A1 | 11/2000 |
| WO | WO 01/14029 A1 | 3/2001 |
| WO | WO 03/004118 A1 | 1/2003 |
| WO | WO 03/061795 A1 | 7/2003 |
| WO | WO 03/084625 A1 | 10/2003 |
| WO | WO 03/089077 A1 | 10/2003 |
| WO | WO 03/089082 A1 | 10/2003 |
| WO | WO 2004/013820 A2 | 2/2004 |
| WO | WO 2004/114073 A2 | 12/2004 |
| WO | WO 2005/029279 A2 | 3/2005 |
| WO | WO 2005/031666 A1 | 4/2005 |
| WO | WO 2005/079242 A2 | 9/2005 |
| WO | WO 2006/028820 A1 | 3/2006 |
| WO | WO 2006/052469 A2 | 5/2006 |
| WO | WO 2007/035618 A2 | 3/2007 |
| WO | WO 2007/040707 A2 | 4/2007 |
| WO | WO 2007/076321 A2 | 7/2007 |
| WO | WO 2007/145999 A2 | 12/2007 |

(56) References Cited

FOREIGN PATENT DOCUMENTS

| WO | WO 2008/014334 A2 | 1/2008 |
| WO | WO 2008/022083 A2 | 2/2008 |
| WO | WO 2008/022084 A2 | 2/2008 |

OTHER PUBLICATIONS

H.X. Mel and Doris Baker, Cryptography Decrypted, 2001 Addison Wesly, chapters 9 to 12.

Virginia Lottery games, downloaded from www.archive.org, Apr. 29, 2007.

Pop Cap Games, Bejeweled, Feb. 3, 2005, http://web.archive.org/web/2005020320244/http://www.go2share.net/game/bejeweled/index.htm.

John Scarne, Scarne's Complete Guide to Gambling, 1961, Simon & Schuster, New York, chapter 4 on lotteries, pp. 125-126.

Wikipedia, "Wheel of Fortune (US Game Show)" Wikipedia, Nov. 13, 2007 <http://en.wikipedia.org/wiki/Wheel_of_Fortune_%28US_game_show%29>.

New Jersey, State of, "Wheel of Fortune" New Jersey Lottery, Nov. 13, 2007 <http://www.state.nj.us/lottery/instant/ig409.htm>.

New Jersey, State of, "Lots O' Spots Bingo" New Jersey Lottery, Dec. 6, 2007 <http://www.state.nj.us/lottery/instant/ig340.htm>.

http://www.powerball.com/powerball/pb_howtoplay.asp, accessed Sep. 14, 2008, All.

Written Opinion of the International Searching Authority (International application No. PCT/US07/76224).

Examiner's first report on patent application No. 2003298941.

* cited by examiner

Front

Pick 1

Pick 2

Pick 5

Pick...

Tally your total matches here:
(see reverse for details)

Back

| score | payout total by level | | | | |
|---|---|---|---|---|---|
| | 1 | 2 | 3a | 3b | |
| 0 | $0.00 | $0.00 | $0.00 | | |
| 1 | $2.00 | $2.00 | $10.00 | $2.00 | |
| 2 | | $3.00 | $0.00 | $0.00 | |
| 3 | | | $0.00 | $0.00 | |
| 4 | | | $10.00 | $2.00 | |
| 5 | | | $250.00 | $20.00 | |
| 6 | | | $25,000.00 | $5,000.00 | |
| 7 | | | | | |
| 8 | | | | | |
| ... | | | | | |

FIG. 10

METHOD FOR PLAYING MULTI-LEVEL GAMES OF CHANCE

RELATED APPLICATIONS

This application is a continuation of co-pending U.S. patent application Ser. No. 11/832,071, filed Aug. 1, 2007, entitled "METHOD FOR PLAYING MULTI-LEVEL GAMES OF CHANCE" by Scott Weller and Matthew Ross, which claims priority under 35 U.S.C. 119(e) to U.S. Provisional Application Ser. No. 60/835,142, entitled "METHOD FOR PLAYING MULTI-LEVEL GAMES OF CHANCE," filed Aug. 1, 2006, both of which applications are incorporated by reference herein in their entirety.

FIELD OF THE INVENTION

The present invention relates generally to the games of chance and, more particularly, to methods of playing multi-level keno.

DESCRIPTION OF THE RELATED ART

Legalized public and private bingo games abound in the United States and throughout the world. Bingo-type games involve a plurality of participants each having at least one pre-printed playing card. Typically, bingo playing cards comprise five columns, corresponding to the letters "B", "I", "N", "G" and "O", whence the game derives its name, and five rows in a boxed matrix. Numbers and/or free spaces populate the boxes in the matrix.

The game of bingo is played by randomly selecting winning numbers from a population of numbers. In a traditional bingo game, a participant wins when a combination of selected winning numbers covers at least one row, column, and/or diagonal of five numbers on at least one participant's playing card. However in many bingo games, numerous other patterns that have been predetermined may also be used for winning; these patterns include those known as Hard Way (five-in-a-row without using the free spot), Six Pack (2×3 or 3×2 matrix), or Small Kite. When a participant covers a winning pattern with winning numbers, he or she declares "Bingo!" Verification of the win occurs immediately and if the win is verified, the game ends and no further numbers are drawn. Generally, there is only a single winner for each game. If there are multiple winners, the prize is divided equally among all winners.

Keno is another type of legalized public and private game common in the United States and throughout the world. Keno-type games typically draw numerous (e.g., 15 to 20) random winning numbers from a larger population of numbers, e.g., integers from 1 to 80. Indeed, keno-type games typically select more winning numbers from the population of numbers than are required to win.

For example, to play keno, a player may select a minimum of four and no more than 10 numbers between 1 and 80. Each selection is called a "spot," so if one selects ten numbers, one is playing a ten spot game. The player marks a blank keno card with the selected numbers, hands in the ticket (e.g., to a clerk at a casino, as discussed below) and receives a duplicate ticket in return. Typically about twenty winning numbers are selected from the population of numbers and game participants may win a prize if they match anywhere between zero and ten of the winning numbers. Thus, a game participant still can win the top prize without having to match all, or even any, of the winning numbers drawn. Keno-type games typically produce numerous opportunities to match winning numbers and thus many opportunities to win.

Moreover, keno-type games are flexible because game participants can choose how many winning numbers they want to try to match in each game, for example two, five, ten, etc. Correspondingly, prizes (e.g., cash jackpots) are greater when more numbers must be, and ultimately are, matched. Keno prizes generally increase commensurate with the odds of matching all player chosen numbers. For example, the prize for matching five out of five player chosen numbers may be five times greater than the prize for matching two out of two player chosen numbers.

Keno is typically played in casinos and in state lotteries. Casinos sell keno tickets to players at special counters or through wandering keno ticket sellers. A player can play more than one keno game on a ticket, and need not be present in the casino while the keno games are being run. The player can come back and see if he or she won any games. If the player has won, a keno ticket can be redeemed for winnings in the casino. Keno games run by state lotteries sell and redeem tickets in a similar manner to casinos, with specified lottery sales locations, e.g. bars and restaurants, replacing the special keno ticket counters. Keno tickets can also be redeemed at these points of sale.

SUMMARY

According to one aspect of the present invention, a game of chance is provided. The game comprises of two or more levels. According to one embodiment of the invention, the game may be one of the group comprising of keno, bingo, UK bingo, and baccarat. According to another embodiment, the game may be a combination of two or more of the group comprising of keno, bingo, UK bingo, and baccarat. According to another embodiment, all levels have the same payout table. According to another embodiment, one or more levels have a different payout table than the first level. According to another embodiment, one or more levels have multiple payout tables. According to another embodiment, the number of levels is pre-determined. According to another embodiment, winners of the top tier in the final level can win at least one of the group standard, a progressive, and a rolling jackpot. According to another embodiment, winners of the top tier in the final level must win a final drawing to win the at least one of the group comprising the standard, the progressive, and the rolling jackpot.

According to one embodiment of the present invention, only one bet at the start of the game is needed to pay to play. According to another embodiment, winners of each tier are required to play the next tier. According to another embodiment, the winnings are paid out after each tier. According to another embodiment, the winnings are paid out only at the end of the game. According to another embodiment, the game operator is a casino. According to another embodiment, the game operator is at least one of a state and a national lottery. According to another embodiment, a player may enter into the game after a first level of the two or more levels by paying a bet greater than an initial bet to play the first level of the two or more levels. According to another embodiment, a player may enter into the game after the first level of the two or more levels by paying a bet greater than a sum of the initial bet plus the carryover(s) to get to the level being entered. According to another embodiment, odds of winning decrease as a level of the two or more levels is increased. According to another embodiment, the individual payout is increased as a level of the two or more levels is increases. According to one aspect of the present invention, a method for operating a game of chance is provided, wherein the game of chance has two or more levels.

The function and advantage of these and other embodiments of the present invention will be more fully understood from the examples described below. The following examples are intended to illustrate the benefits of the present invention, but do not exemplify the full scope of the invention.

BRIEF DESCRIPTION OF THE DRAWINGS

In the drawings,

FIG. 10 is an illustrative embodiment of a game card according to one embodiment of the present invention.

DETAILED DESCRIPTION OF THE INVENTION

Embodiments and aspects of the invention relate generally to new methods for playing multi-level games of chance including keno and bingo. Though standard games of chance are popular, existing games of chance have some deficiencies including that each game has only one level and thus finishes quickly without having time for the player to build excitement during the game.

Therefore, aspects of the present invention address the above-identified problem and provide a more exciting play experience for games of chance, as discussed in more detail below. In one embodiment of the present invention, the game of chance may be any game of chance including keno, bingo, UK bingo, slots, poker, dominoes, and blackjack. According to another embodiment of the present invention, all the levels in the multi-level game of chance need not be the same game of chance.

Figure 2:
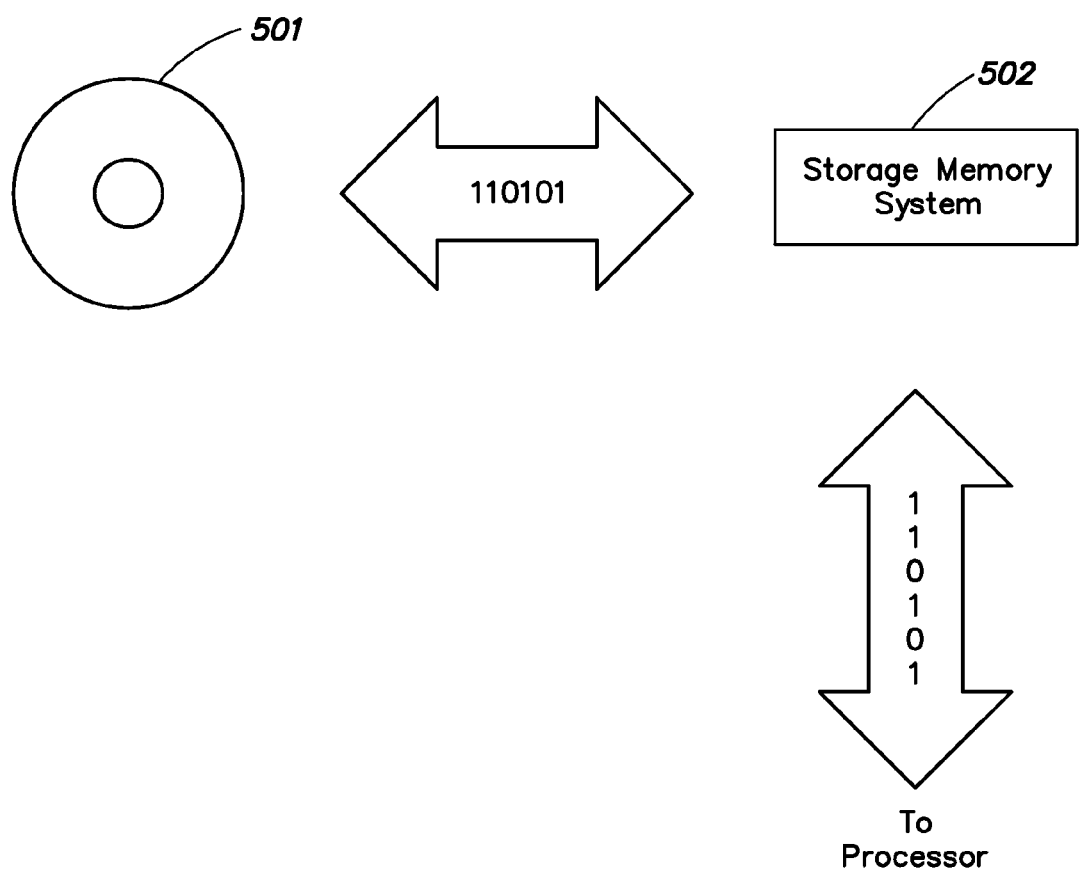
FIG. 2 is an illustrative embodiment of a computer data storage system.
Figure 7:
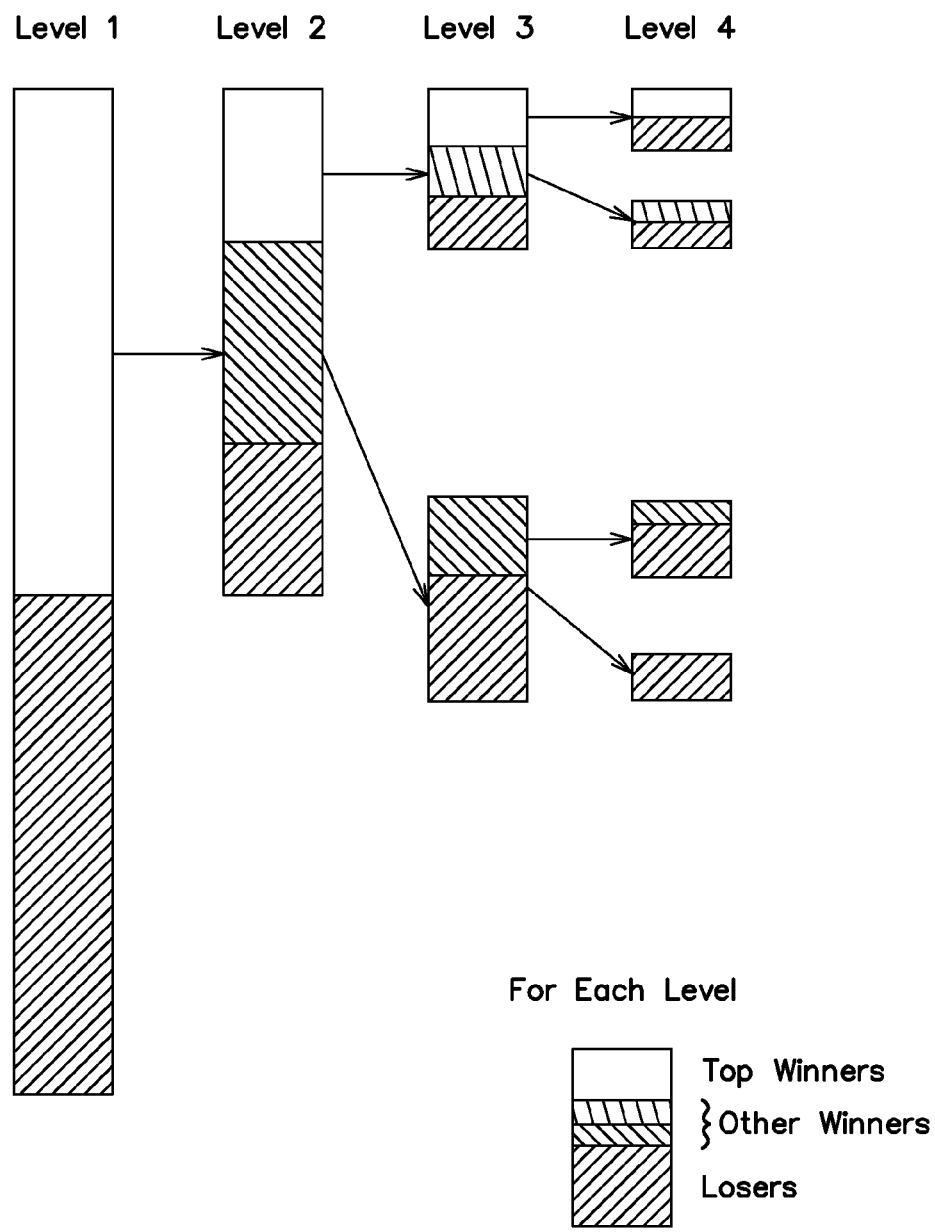
FIG. 7 is an illustrative embodiment of a flow of winners through a game.

According to an embodiment of the invention, a game of chance has two or more levels as illustrated in FIG. 7. According to another embodiment, winners of each level in the game of chance may progress to the next level in the game of chance. Upon winning, a winner may be given a choice as to whether to proceed to the next level. Preferably, a winner must proceed to the next level. As illustrated in level 1 of FIG. 7, a level may have only one winner tier. The winners of this level may move on to level 2 as one group. However, as illustrated in level 2 of FIG. 7, winners may be divided into two or more tiers. For example, all the winners may proceed to level 3 as one group or preferably as illustrated in FIG. 2, the winners of each tier may proceed to the next level as a group for each winner tier. According to an embodiment of the invention, each level in the game of chance may have one or more winner tiers.

According to one embodiment of the invention, a game may have to continue to another level until only one individual is left in the top winning tier. Preferably, in another embodiment, a game has a pre-determined number of levels.

According to another embodiment of the invention, any player in the top winning tier in the last level of the game may be offered a chance to win a final prize. This final prize may be a progressive jackpot that may or may not be split between all final chance winners. If no final chance winner exists, the jackpot may roll over to the next game.

A typical keno ticket shows all the possible elements in a grid or pattern with the elements a player has chosen being highlighted or otherwise differentiated from the elements that have not been chosen. The typical keno ticket also indicates the keno games that the player is playing and may also indicate when the last game ends.

According to one embodiment, a game may have a predetermined payout table associated with it. The payout table may have a listing of the ways to obtain a payout and its payout amount. For example for keno, the possible ways to obtain a payout include matching all, some, or none of the player chosen elements with the randomly chosen winning elements for a specific keno game. The payout amount for each way to win may depend upon but may not be rigidly determined by the odds of obtaining the particular way to obtain a payout in the predetermined fixed number of drawn winning elements; for example, the odds of matching ten player chosen elements with twenty winning elements drawn may be twice that for twenty player chosen elements, but the payout may be only one and one half times higher for matching the twenty player elements chosen versus ten player chosen elements.

The payout table may also have adjustments for a player's subscription. For instance, the payout may increase if the player has a multiple game subscription or high payment per game. The payout may also be adjusted for numerous other criterion including frequent player credits. Of course, all payout adjustments must meet any legal requirements for the gaming jurisdiction in which the game is played.

According to an embodiment of the invention, each level in a game may also have an associated payout table. The following tables illustrate possible payout tables for a three-level keno game. In this illustration, the bet increases and the odds of winning the top prize decrease with each successive level. Level 1 has only one winning and one losing tier. Level 2 has two winning tiers and one loss tier. Each winning tier in Level 2 proceeds to a different payout table in the third level; the top winning tier proceeds to Level 3a and the lower winning tier proceeds to Level 3b.

| Payout Table- Level 1 | |
|---|---|
| Size of Field | 2 |
| Number of Draws | 1 |
| Max Catch | 1 |
| Bet | $5.00 |

| Catch | Keno Probability | Payout |
|---|---|---|
| 1 | 50% | $8.00 |
| 0 | 50% | -0- |

Probability of Winning = 50%

Payout Table- Level 2

| | |
|---|---|
| Size of Field | 5 |
| Number of Draws | 2 |
| Max Catch | 2 |
| Bet | $6.00 |

| Catch | Keno Probability | Payout |
|---|---|---|
| 2 | 10% | $20.00 |
| 1 | 60% | $5.00 |
| 0 | 30% | -0- |

Probability of Winning = 70%

Payout Table- Level 3a

| | |
|---|---|
| Size of Field | 15 |
| Number of Draws | 5 |
| Max Catch | 5 |
| Bet | $17.00 |

| Catch | Keno Probability | Payout |
|---|---|---|
| 5 | 0.03% | $25,000.00 |
| 4 | 1.67% | $250.00 |
| 3 | 14.99% | $10.00 |
| 2 | 39.96% | -0- |
| 1 | 34.97% | -0- |
| 0 | 8.39% | $10.00 |

Probability of Winning = 24.68%

Payout Table- Level 3b

| | |
|---|---|
| Size of Field | 15 |
| Number of Draws | 5 |
| Max Catch | 5 |
| Bet | $3.00 |

| Catch | Keno Probability | Payout |
|---|---|---|
| 5 | 0.03% | $5,000.00 |
| 4 | 1.67% | $20.00 |
| 3 | 14.99% | $2.00 |
| 2 | 39.96% | -0- |
| 1 | 34.97% | -0- |
| 0 | 8.39% | $2.00 |

Probability of Winning = 24.68%

Figure 9:
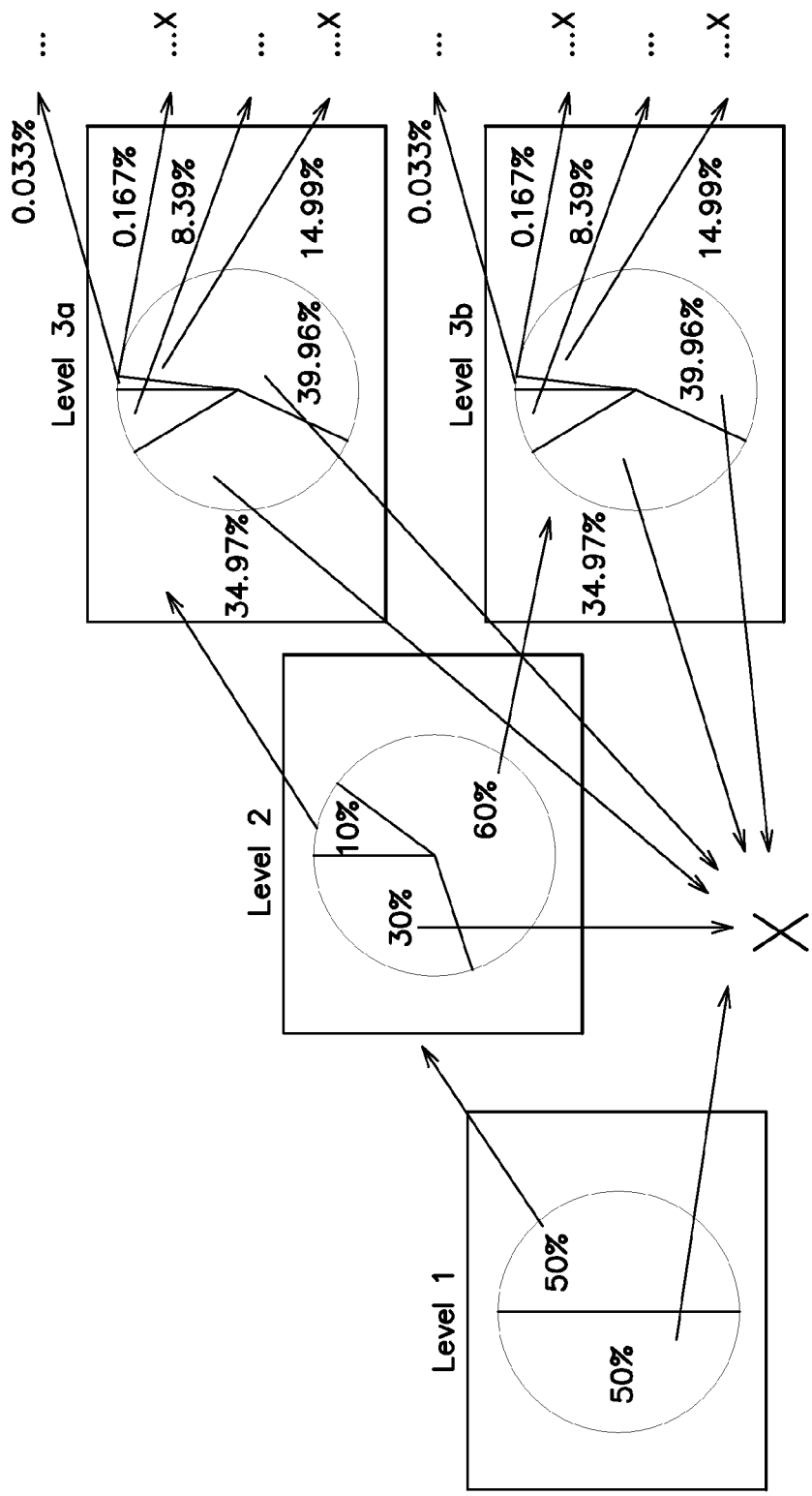
FIG. 9 is an illustrative embodiment showing an example percentage of winners and losers in a game example.

FIG. 9 illustrates an example percentage of players that may be expected to obtain the different outcomes in each level of the above example based upon statistics.

FIG. 10 is an example of a game card that a player may use to enter a game. The game card shown is illustrative of the game example above. A player may submit his or her picks for each level by marking choices for each level, i.e. choose one out of two number choices for Level 1, two out of five choices for Level 2, and five out of fifteen choices for Level 3.

Figure 8:
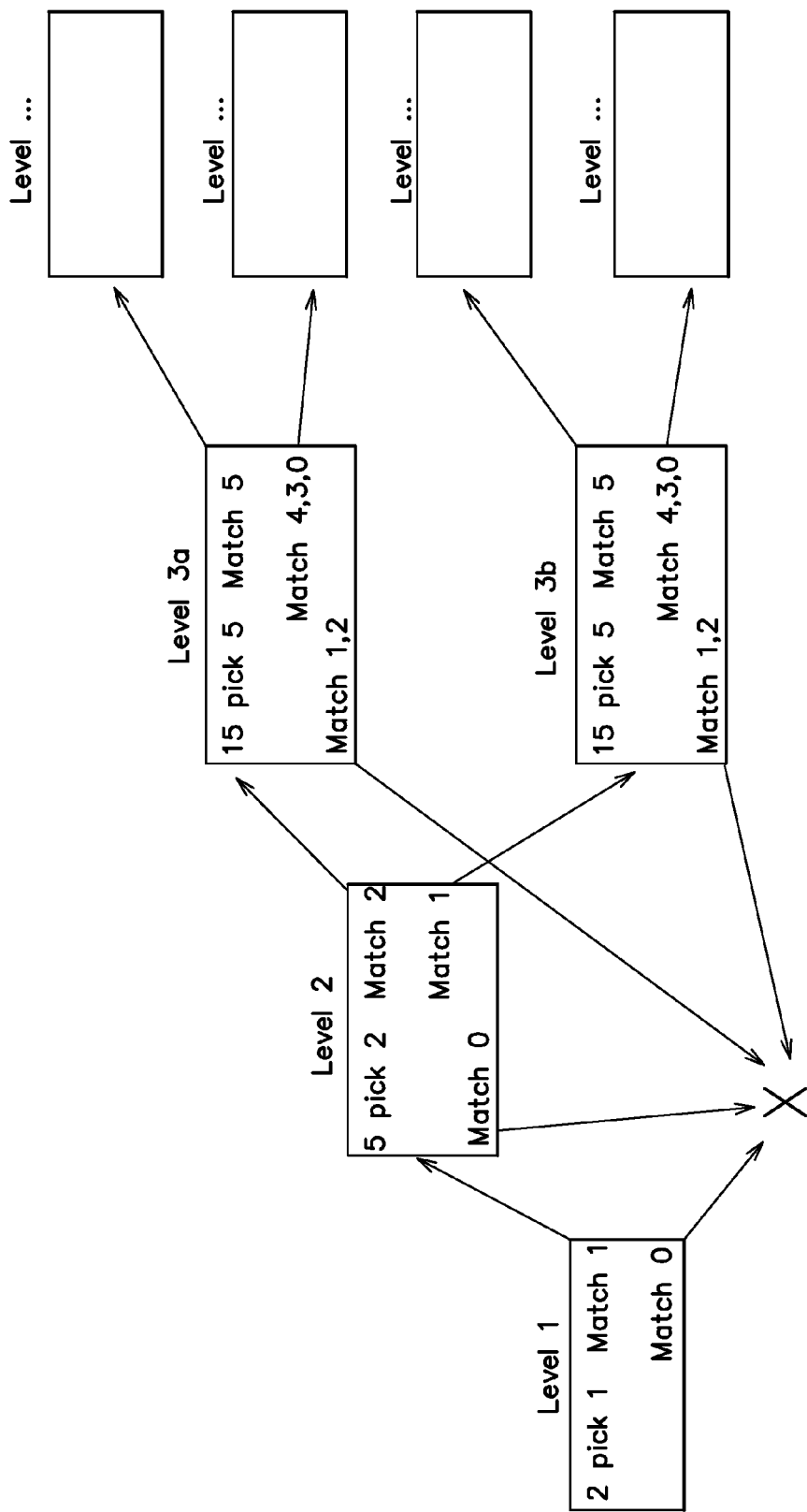
FIG. 8 is another illustrative embodiment of a flow of winners through a game.

As shown in FIG. 8, a winning tier may include more than one way to match numbers. For example in Level 3a, matches of 3, 4 or none out of 5 numbers drawn from 15 total lead to the same winning tier for the next level.

Bets for the multi-level game of chance may be covered in any known manner. A player may decide to or is required to pay the bet required to move to the next level upon winning. A payout of the last level won may be fully or partially used or may not be used at all by the player to pay for the bet at the next level. According to an embodiment of the invention, a player may pay one bet to play a level, with winnings fully or partially carrying on to the next level.

For the payout tables in the three-level keno game illustrated above, a winnings table may be as shown below with a portion of the winnings from a level being used to pay the bet for the next level. In the illustrated winnings table, each player pays $5.00 to play a game. In an embodiment of the invention, the odds of winning decreases as the level increases. In another embodiment of the invention, the individual payout increases as the level increases.

Winnings Table

| Level | Keno Game | Bet | Win Scenarios |
|---|---|---|---|
| 1 | Pick 1, Draw 1 of 2 | $5.00 | Win $8.00: Keep $2.00, Carryover $6.00 |
| 2 | Pick 2, Draw 5 | $6.00 | Win $20.00: Keep $3.00, Carryover $17.00; Win $5.00: Keep $2.00, Carryover $3.00 |
| 3a | Pick 5, Draw 15 | $17.00 | Win as shown in payout table |
| 3b | Pick 5, Draw 15 | $3.00 | Win as shown in payout table |

Prior to playing a multi-level game of chance, a game player may need to pay for playing. For example, a game player may pay using money or loyalty points. In particular, a game player may pay using money by debit card, credit card, check, cash or account credit either with the gaming operator or an affiliated organization. Alternatively, a game player may pay using loyalty points from an account held either by the gaming operator or by an affiliated organization. Loyalty points may be obtained from any type of organization but are generally associated with loyalty programs such as frequent flier programs for airlines, frequent stay programs for hotels, or frequent visitor programs for casinos. The game player may pay in person using a cashier (e.g., at a casino or a state lottery agent).

Typically, a player may pay to play before the first level is played in a game. However according to an embodiment of the invention, a player may pay to enter any level of the game. The player may be new to the game or may have lost in an earlier level of the same game. According to another embodiment of the invention, a player paying to enter a game above the first level may be expected to pay more than the initial bet required for the first level of the game or to pay more than the aggregate of the initial bet plus the carryovers for players winning from all lower levels to get to the present level. In the example illustrated above, a player entering into level 3a may be expected to pay more than $5.00, the entry fee to level 1, or to pay more than $28.00 ($5.00+$6.00+$17.00).

In one embodiment of the invention, players may subscribe to play multiple consecutive game sessions. That is, the player pays at one time to play many consecutive games. The player may also choose to have his or her subscription automatically renewed.

According to one embodiment of the invention, players may also enter to play the multi-level game of chance using an alternative method of entry (AMOE). AMOE is a required available method of entry into a sweepstakes that does not require a purchase. Sweepstakes are usually used as a promotional or marketing tool. Any company or organization offering a sweepstakes ticket in exchange for a purchase is typically required to also offer an AMOE to the sweepstakes that is not linked to a purchase.

A common AMOE method includes requiring an individual interested in entering the sweepstakes, to the sweepstakes entity a postcard with his or her name, address, or other contact information. Another AMOE method includes requiring an individual to sign on to a free Internet website and to submit the required information for free. Numerous other methods may be used for AMOE. Most sweepstakes limit the number of times one individual or family may enter a sweepstakes by AMOE. An individual entering a sweepstakes by AMOE is required by law to have the same odds of winning each of the available prizes as do individuals who have paid for entry (e.g., by making a purchase of a product or service).

According to one embodiment of the invention, it is realized that an AMOE (alternative method of entry) may be used to enter a multi-level game of chance. More particularly, it is possible to develop, implement and run the game(s) of this invention with an AMOE method of entry as is usually associated with sweepstakes. An individual may enter the game by AMOE using the postcard or the online methods outlined above. The game player entering by AMOE has the same odds to win the payout associated with the game in which they are entered as do any other players who have paid for entry. The game player entering by AMOE may also be limited to a small number of game sessions within a given period of time. For example, the game player may be limited to entering one game in one year or two games in one month. Other numbers of games and given periods may be any number, and the invention is not limited to any particular implementation.

According to one embodiment, the game session that the game player entering by AMOE is entered into may be determined by the game player on the AMOE entry form. For example, the post card AMOE may be required to state the date and the time of the game session that the game player wants to enter. Alternatively, the game entered may be the next starting game session after the AMOE is received and logged. As another alternative, AMOE entries may be assigned to a specific game(s) each hour, day, week, or other time interval.

The payout table for each game may also be supplemented by a jackpot that transfers from game session to game session until the jackpot is paid out. These types of jackpots are commonly called rolling or progressive jackpots. A rolling jackpot may be the same amount that transfers from game to game until it is paid out. A progressive jackpot is a rolling jackpot that increases as more game, game cards, or other criterion are played. According to an embodiment of the invention, a single-game, progressive, or rolling jackpot may be won by winners of the top winning tier in the final level. According to another embodiment of the invention, the jackpot may be won only through a final chance determination.

The payout in each tier may also be affected as to whether the game has a fixed payout for each winning tier or whether the payout is shared. If the payout is fixed for a win, all players that have a tier winner for a certain type of win will be paid the amount listed in the payout table for the win; in this instance, each player is playing solely against the game operator. If the payout is shared, then all players that have a game winner for a certain type of tier win will be paid a total of the amount listed in the payout table. Each player may receive a share of the total payout depending upon how much he or she paid for the game or any other legal criteria.

The final payout may also be affected by a secondary bonus play. Bonus play is well known in the gaming industry and works to increase some payouts by offering the chance to multiply a payout.

One or more games may proceed concurrently; the parameters of the concurrent games may be the same, similar, or different. For example, the drawn winning elements may be used for one or more concurrent games if the predetermined set of elements is the same for the one or more concurrent games.

Additionally, the games may run continually, i.e. one after another. When one game ends, another can begin immediately or in a short period of time thereafter. The games may follow a precise time schedule so that players know when games will begin. For example, if game play in a game requires four and a half (4.5) minutes to complete, then the next game may start immediately or in a defined period (e.g., thirty seconds) to maintain a schedule of games sessions. For example, game sessions may occur every hour, on the hour, and at every five minutes in between (i.e., at :00, :05, :10, :15, :20, :25, :30, :35, :40, :45, :50, :55 of each hour). Because, according to one embodiment, the game sessions may run continually, it may be possible that a game will have no game player or game card that is being played within the particular game session or instance.

Prior to a game, the game player may choose from the predetermined set of elements for a particular game. A game player may choose the elements for trying to match the drawn winning elements for a game manually or using a computer system. Alternatively, according to one embodiment of the invention, a computer system may automatically choose the player chosen elements for a game player. Because a computer system can both choose the player chosen elements and draw the winning elements, a player need not configure and attend each game, as discussed further below.

The predetermined set of elements may be any letter or character, number, symbol, color, logo, shape, drawing or other item that may be represented. The element may be a letter or character of any one or more languages including, but not limited to, English, Russian, Japanese, Chinese or Greek. The element may also be any random combination of letters or characters including words and phrases. The element may also be a number of any language including, but not limited to, English, Chinese or Roman, and the number may be represented by items. For example, the number of stars in the cell or the dots on the face of a die or dice. The number may be negative, zero, positive, integer, fraction, decimal, real or imaginary, and in one example, the number is preferably a positive integer. The element may also be a symbol from anywhere, such as, for example, astrology, religion, printing and computer fonts, road signs, or law. The element may be any color including, but not limited to, black, white or shades of gray. The element may also be a logo of a company or product name or trademark.

The winning elements for a game may be randomly drawn by hand or by computer system from the predetermined set of elements for the game. When the drawing is by hand, the winning elements may be chosen from pieces of paper drawn out of a hat or drum, by using balls or discs in a rotating or air blown sphere, or any other method that can be used for drawing elements for a keno-type game. The hand-drawn winning elements may then be displayed or entered into a computer system. In one preferred embodiment, the winning element(s) is randomly drawn by computer system from the predetermined set of elements for a particular game.

The game player may view the game proceedings using television, wireless or line telephone with display, handheld device, kiosk, computer or in person; depending upon the viewing medium, it may be necessary to download game information prior to viewing while other viewing medium may allow viewing of the streamed game information. For example, the game player may operate a computer system that has an Internet-enabled interface (e.g., using Macromedia Flash or Java) and the computer system may display streamed game information within that interface.

According to one embodiment, a player may purchase one or more game tickets from a vendor as described above. After all the drawn winning elements are drawn for a game, a player may check the ticket for a winning number of matching elements and then inform the game operator that the game ticket is a winner. If the game player is playing the game remotely, for instance over the web or interactive television, or if the game operator is a computer system, then the player may use e-mail, instant messaging, or other electronic or voice indication method (e.g., the telephone) to notify the game operator of the winning keno ticket. The game operator would then authenticate and verify the game player and the winning game ticket. The game operator would then verify that the game player won by checking the game ticket against the drawn winning elements for the appropriate games. Such methods are well known in the remote and electronic gaming industry.

As stated above, it may also be possible that a game card may be a winner because of not matching the drawn winning elements. For example, in a game with forty drawn winning elements out of a predetermined set of elements containing seventy-five items, a game ticket that has no matches in a specific game may have a payout equivalent to a game ticket matching ten out of ten player chosen elements to the forty drawn winning elements.

During the period of time between the games, a game operator may make announcements, rest, or any number of actions. If the game is played using a computer system, then advertisements, sponsorships, public service announcements or any visual or auditory content may be inserted. The advertisements, etc. may also be inserted into the game display during a game.

A game player may also be able to replay or review a past game using a video device including kiosk, telephone with display, television, computer or handheld device. By accessing the proper game in the computer system, a game player may be able to see a past game as it occurred, the winning tickets and winning game player identity(ies), the drawn winning elements, or possibly any other aspect of the game of interest.

According to another embodiment of the invention, the game, its games, and the game play are partially or fully operated using one or more computer systems. A computer system may be a single computer that may be a supercomputer, minicomputer or a mainframe or personal computer. A computer system may also be any multiple and combination of computer types that work together; multiple computer systems may also be needed to run the whole game. The computer system also may include input or output devices, displays, or storage units.

Figure 3:
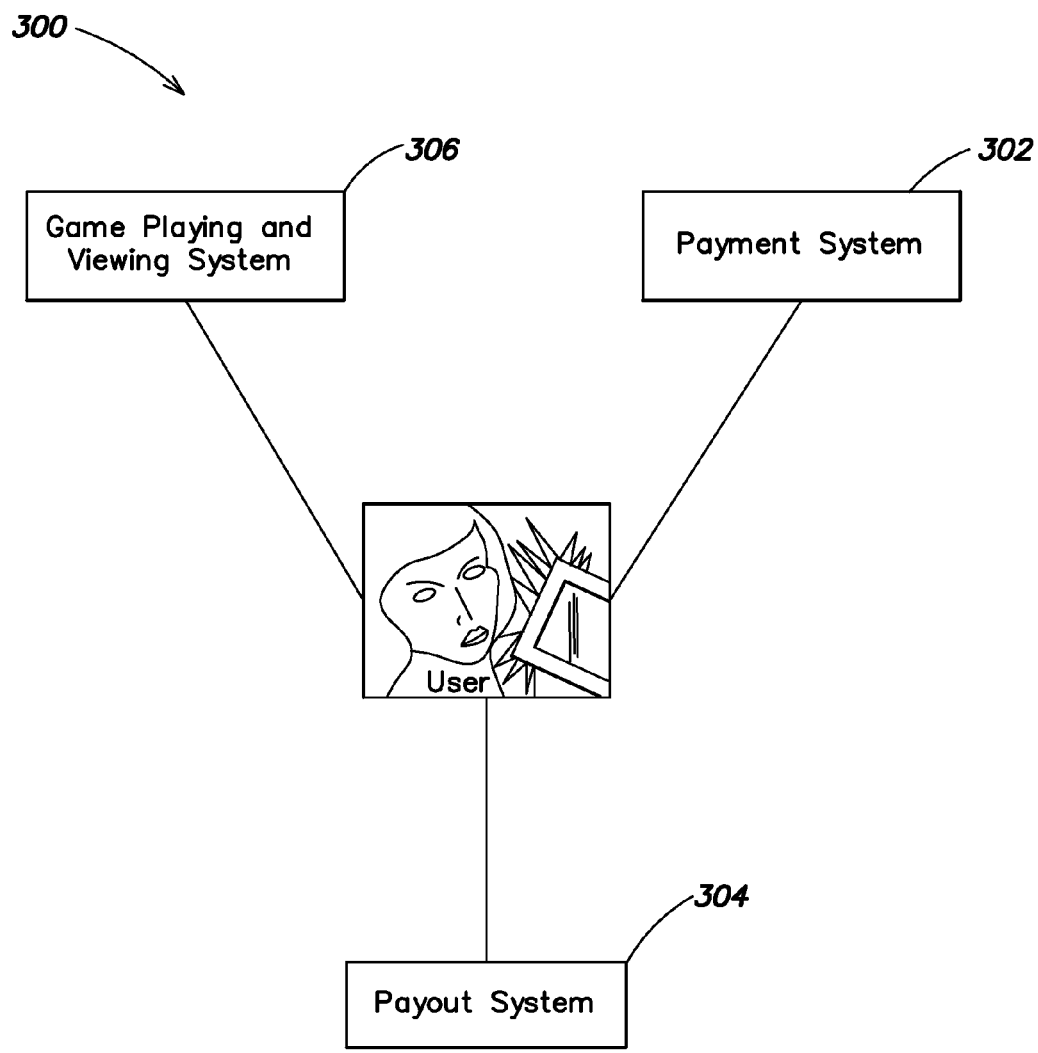
FIG. 3 is an illustrative embodiment of several components of a game computer system.
Figure 4:
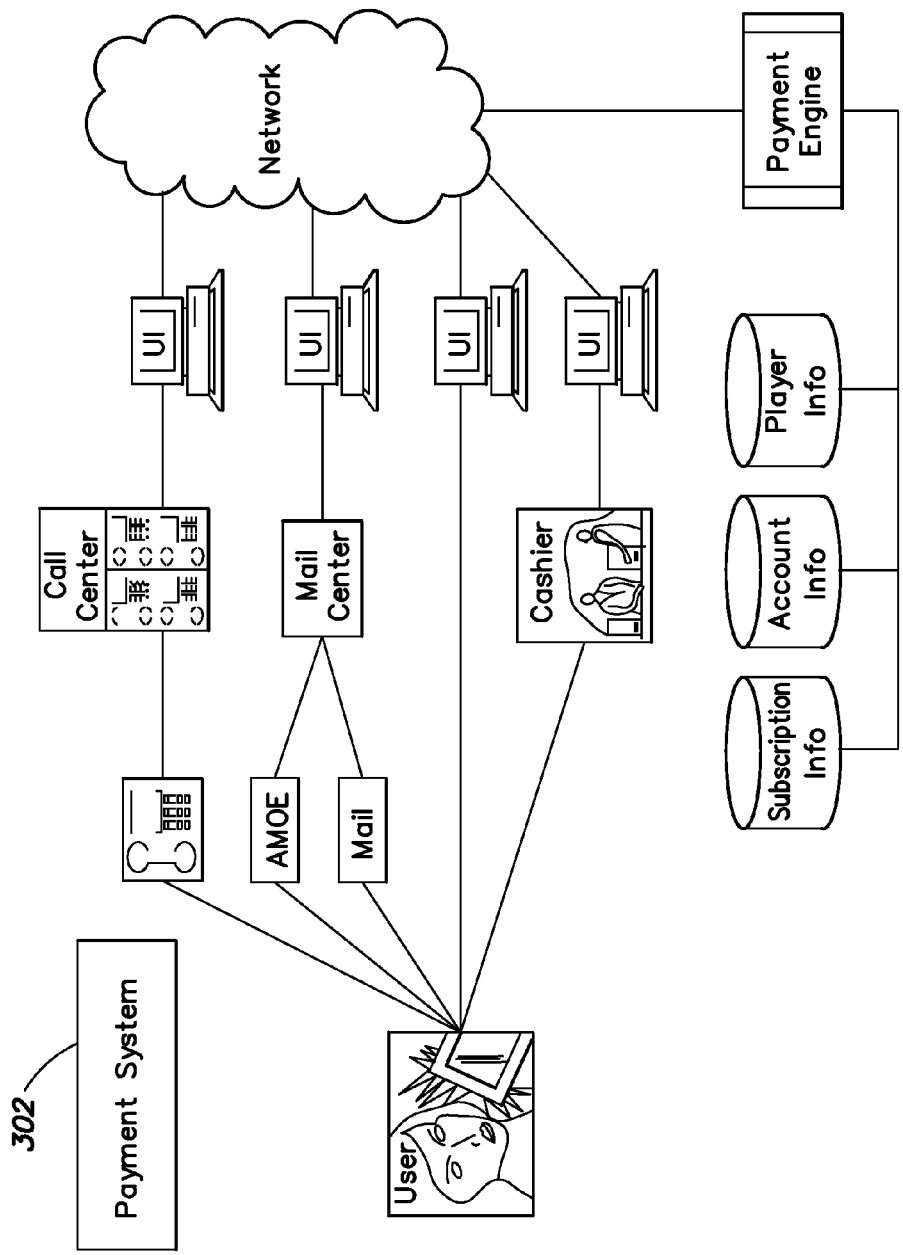
FIG. 4 is an illustrative embodiment of several components of a game payment subsystem according to one embodiment of the present invention.
Figure 5:
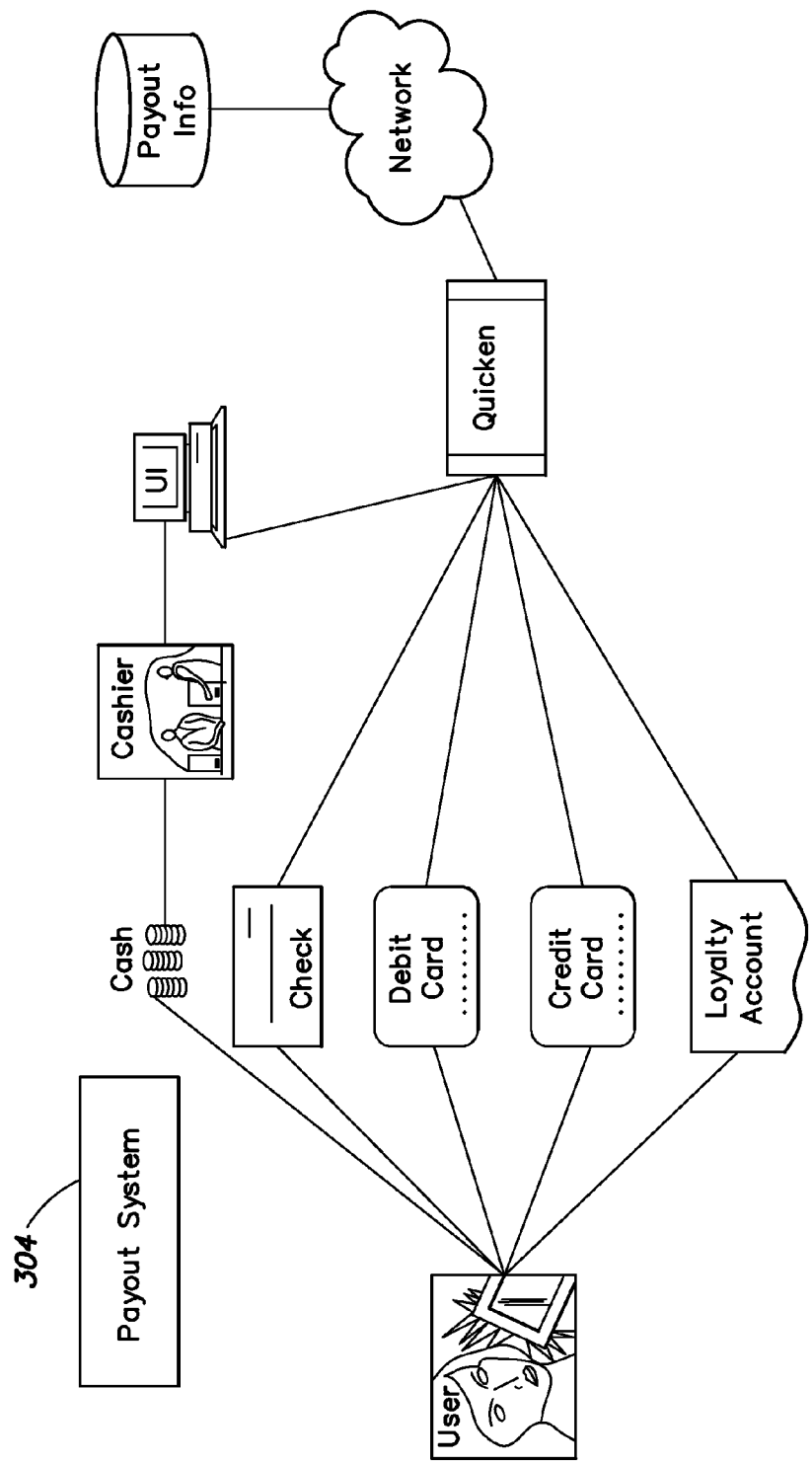
FIG. 5 is an illustrative embodiment of several components of a game payout subsystem according to one embodiment of the present invention.
Figure 6:
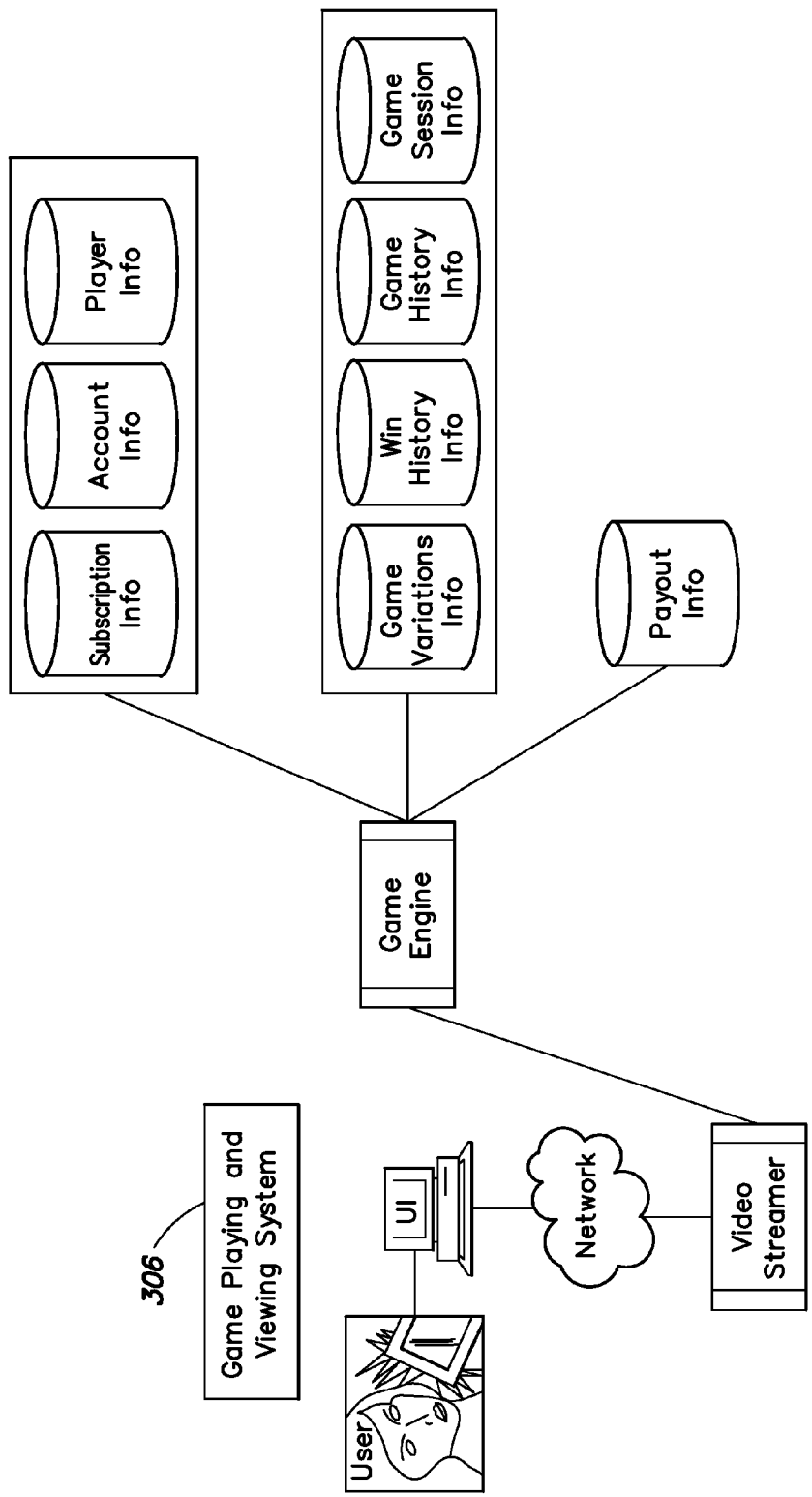
FIG. 6 is an illustrative embodiment of several components of a game playing and viewing subsystem; according to one embodiment of the present invention.

A computer system to run the game described above may include one or more component systems (e.g., system 300 as shown in FIG. 3). One system may handle payment, subscription and/or AMOE by players to enter the games (e.g., as shown in FIG. 4). Another system may handle playing and viewing the game (e.g., as shown in FIG. 6) and the third system may handle payouts (e.g., as shown in FIG. 5). The game system may also be connected by direct line or network to other computer systems including systems for handling casino or hotel loyalty programs, reservations, in-room television viewing or gambling floor kiosks. Connections to other computer systems may be performed using one or more of the system components described below.

A payment component (e.g., system 302) may include one or more of a number of well-known systems (e.g., as shown in FIG. 4). For example, a player may be able to pay to play one or more games using a telephone and speaking with a call center representative who manually inputs player, payment, and subscription information into a computer via a user interface. In the computer, data may be stored in a data structure that is stored in a memory of the computer system. As used herein, a "data structure" is an arrangement of data defined by computer-readable signals. These signals may be read by a computer system, stored on a medium associated with a computer system (e.g., in a memory, on a disk, etc.) and may be transmitted to one or more other computer systems over a communications medium such as, for example, a network. Also as used herein, a "user interface" or "UI" is an interface between a human user and a computer that enables communication between a user and a computer. Types of UIs include a graphical user interface (GUI), a display screen, a mouse, a keyboard, a keypad, a track ball, a microphone (e.g., to be used in conjunction with a voice recognition system), a speaker, a touch screen, a game controller (e.g., a joystick), etc., and any combinations thereof.

The player information that may be input includes name, address, telephone number, and age. Payment information may include a credit or debit card number or loyalty account information. Subscription information may include first game date and time, number of games to play, number of game pieces per game, and bet per game piece. Based upon the payment and subscription information, the call center representative would then verify that the payment information is valid and that enough credit or funds is available for the player's desired subscription.

A similar system may exist for players entering using the mail or a post card AMOE except the call center may be replaced by a mail center having representatives that enter information into one or more computers via a user interface. For example, a cashier (e.g., at a casino or at a lottery agent) for players to pay cash to play, may also have the ability to input player, account, and subscription information using a user interface of a computer system.

Computer systems or pay engines for handling electronic or online payment and subscriptions may also be used. Such systems are well known including Paypal and those that run online subscription services like the Delphion intellectual property website or The Wall Street Journal Online. Using such a system, a player interacts directly with the user interface to input information into the payment data structure.

Various pay systems and the various user interfaces may be located on one or more computer systems coupled by a network with the computer system(s) containing the player, account, and subscription database(s). As used herein, a "network" or a "communications network" is a group of two or more devices interconnected by one or more segments of transmission media on which communications may be exchanged between the devices. Each segment may be any of a plurality of types of transmission media, including one or more electrical or optical wires or cables made of metal and/or optical fiber, air (e.g., using wireless transmission over carrier waves) or any combination of these transmission media.

The above are merely an illustrative embodiment of the pay system component. Such an illustrative embodiment is not intended to limit the scope of the invention, as any of numerous other implementations of the pay system component, for example, variations of online payment, are possible and are intended to fall within the scope of the invention. For example, the payment system component may include using pay-per-view systems associated with interactive television or the pay engine may additionally deliver a receipt to the player by either e-mail or mail. None of the claims set forth below are intended to be limited to any particular implementation of the pay system component unless such claim includes a limitation explicitly reciting a particular implementation.

Payout systems (e.g., payout system 304) are also well-known and may include one or more standard systems or payout engines for making payouts for winning (e.g., as shown in FIG. 5). For example, a standard application programming interface such as 'Quicken' (available commercially from Intuit Inc., Mountain View, Calif., USA) may be used to write and mail checks or credit a debit card, credit card (if legal in the jurisdiction of play), or loyalty account. 'Quicken' may obtain the payout information by accessing a payout data structure across a network. As used herein, an "application programming interface" or "API" is a set of one or more computer-readable instructions that provide access to one or more other sets of computer-readable instructions that define functions, so that such functions can be configured to be executed on a computer in conjunction with an application program.

'Quicken' is merely an illustrative embodiment of the payout system. Such an illustrative embodiment is not intended to limit the scope of the invention, as any of numerous other implementations of the payout system, for example, variations of online payout, are possible and are intended to fall within the scope of the invention. Additionally, a cashier may also have access to payout information using a user interface to the payout data structure through a network; the cashier then makes a payment to the winning player based upon the accessed information. None of the claims set forth below are intended to be limited to any particular implementation of the pay system unless such claim includes a limitation explicitly reciting a particular implementation.

A game playing and viewing system (e.g., system 306) according to one embodiment of the present invention may comprise of a number of components for performing specific functions as shown for example in FIG. 6. The components may include, for example, storage components for data structures for storing game variations, present game session information, game session history, and win history. A game playing and viewing system may also include components used to access the payment and payout data structures.

The game playing and viewing system according to one embodiment of the present invention also include a game engine. A game engine may perform numerous functions, including drawing winning elements for a game and displaying the drawn winning elements through any communication means, including on a call board on the casino floor, over the Internet (e.g., through a website or internet messaging, or e-mail), or by text messaging on a cell phone. The game playing and viewing system may also receive communication from players indicating a winning game ticket. Communication may be received using any method, including over the Internet (e.g., through a website, Internet messaging, or e-mail) or by text messaging on a cell phone.

Acts described above and various embodiments and variations of these methods and acts, individually or in combination, may be defined by computer-readable signals tangibly embodied on a computer-readable medium, for example, a non-volatile recording medium, an integrated circuit memory element, or a combination thereof. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a computer system, e.g., the computer system described below in relation to FIG. 1, that performs the functions described above can be generically considered as one or more controllers that control the above-discussed functions. The one or more controllers can be implemented in numerous ways, such as with dedicated hardware, or using a processor that is programmed using microcode or software to perform the functions recited above.

Another component of the game playing and viewing system may be a driver that streams video via a broadband, satellite, or wireless medium to a user interface. If the game is played completely automatically, the user interface may be merely a video terminal including television with no user input means. Viewing access may be controlled by standard means for conditional access including using set top box addresses, telephone numbers or Internet protocol (IP) addresses.

The above is merely an illustrative embodiment of a game playing and viewing system. Such an illustrative embodiment is not intended to limit the scope of the invention, as any of numerous other implementations of a game playing and viewing system, for example, variations of conditional access, are possible and are intended to fall within the scope of the invention. None of the claims set forth below are intended to be limited to any particular implementation of a game playing and viewing system unless such claim includes a limitation explicitly reciting a particular implementation.

System 300, and components thereof such as the payment, payout, and game engines, may be implemented using software (e.g., C, C#, C++, Java, or a combination thereof), hardware (e.g., one or more application-specific integrated circuits, processors or other hardware), firmware (e.g., electrically-programmed memory), or any combination thereof. One or more of the components of 300 may reside on a single system (e.g., the payment subsystem), or one or more components may reside on separate, discrete systems. Further, each component may be distributed across multiple systems, and one or more of the systems may be interconnected.

Further, on each of the one or more systems that include one or more components of 300, each of the components may reside in one or more locations on the system. For example, different portions of the components of 300 may reside in different areas of memory (e.g., RAM, ROM, disk, etc.) on the system. Each of such one or more systems may include, among other components, a plurality of known components such as one or more processors, a memory system, a disk storage system, one or more network interfaces, and one or more busses or other internal communication links interconnecting the various components.

System 300 may be implemented on a computer system described below in relation to FIGS. 1 and 2.

System 300 is merely an illustrative embodiment of a game system. Such an illustrative embodiment is not intended to limit the scope of the invention, as any of numerous other implementations of the game system, for example, variations of 300, are possible and are intended to fall within the scope of the invention. For example, a parallel system for viewing by interactive television may include one or more additional video streamers specific for interactive television. None of the claims set forth below are intended to be limited to any particular implementation of the game system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate play of the described game according to various embodiments of the invention. Further, the software design system may be located on a single computer or may be distributed among a plurality of computers attached by a communications network.

A general-purpose computer system according to one embodiment of the invention is configured to perform any of the described game functions including but not limited to player subscription or payment, player chosen elements or elements chosen for the player, drawing winning elements, and communicating with, verifying, and paying winners. It should be appreciated that the system may perform other functions, including network communication, and the invention is not limited to having any particular function or set of functions.

Figure 1:
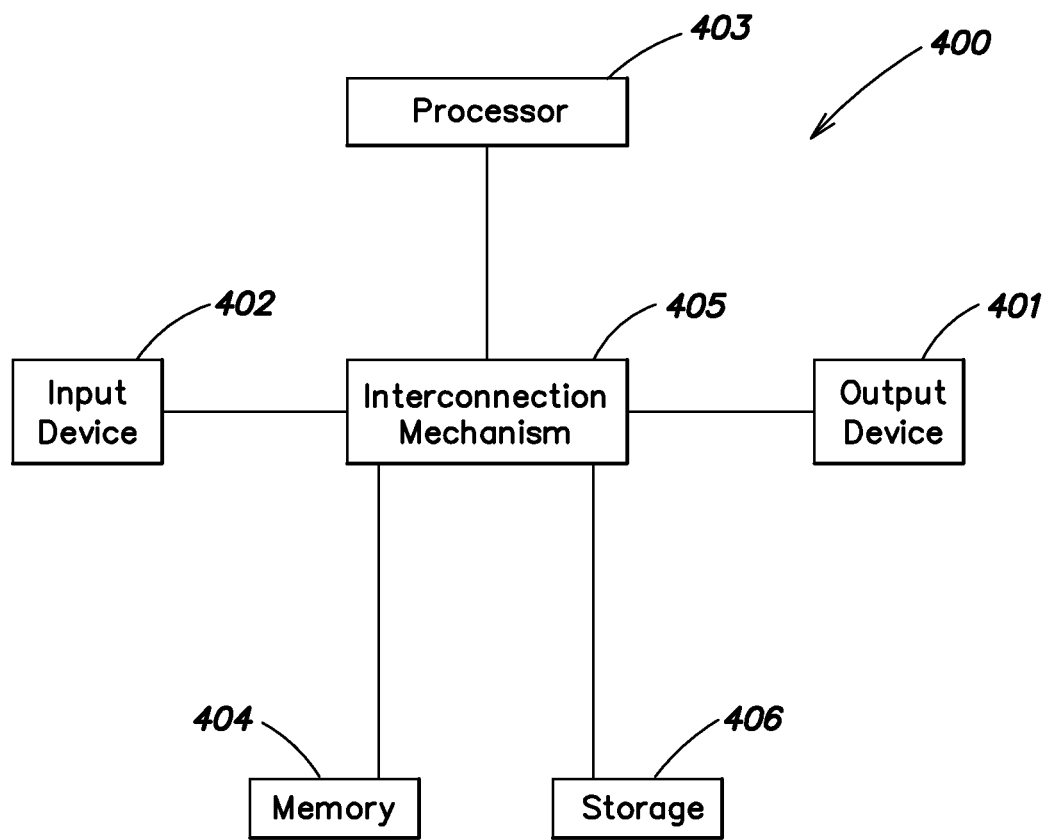
FIG. 1 is an illustrative embodiment of a general-purpose computer system upon which various aspects of the present invention may be practiced.

For example, various aspects of the invention may be implemented as specialized software executing in a general-purpose computer system 400 such as that shown in FIG. 1. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, trackball, microphone, touch screen, and one or more output devices 401, e.g., a printing device, display screen, or speaker. In addition, computer system 400 may contain one or more interfaces (not shown) that connect computer system 400 to a communication network in addition or as an alternative to the interconnection mechanism 405.

The storage system 406, shown in greater detail in FIG. 2, typically includes a computer readable and writeable nonvolatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404 and 502 and then copies the data to the medium 501 after processing is completed. A variety of mechanisms are known for managing data movement between the medium 501 and the integrated circuit memory element 404 and 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 1. It should be appreciated that various aspects of the invention may be practiced on one or more computers having a different architecture or components than that shown in FIG. 1.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention.

These components may be executable, intermediate (e.g., IL), or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML, or other format that, when viewed in a window of a browser program, render aspects of a graphical-user interface (GUI) or perform other functions). Various aspects of the invention may be implemented as programmed or non-programmed elements, or any combination thereof.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, shall be closed or semi-closed transitional phrases, as set forth, with respect to claims, in the United States Patent Office Manual of Patent Examining Procedures (Original Eighth Edition, August 2001), Section 2111.03.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A multi-level game of chance for a plurality of players conducted via at least one computer, the game of chance comprising:

a plurality of levels provided via the computer, the plurality of levels comprising a first level, at least one intermediate level, and a final level, each level above the first level comprising a plurality of winning tiers and at least one losing tier, wherein players in the winning tiers advance to a next level; and a plurality of games, wherein each level comprises one of the plurality of games provided via the computer, wherein at least two different games are provided throughout the plurality of levels via the computer, wherein the at least two different games are provided in separate levels of the plurality of levels and are not the same game, wherein for each of the games, the computer determines if the player obtains one of a plurality of winning outcomes, wherein if the player obtains one of the plurality of winning outcomes, the computer places the player into one of the winning tiers, wherein the computer determines which winning tier the player is placed into by segregating the player from the plurality of players based on at least one type of winning outcome, wherein once the player is placed in the winning tier, the player must play the next level; and wherein at least one of the plurality of levels includes more than one way to win the level as determined via the at least one computer.

2. A game of chance according to claim 1, wherein the plurality of games are a combination of two or more of the group comprising of keno, bingo, UK bingo, and baccarat.

3. A game of chance according to claim 1, wherein each of the plurality of levels has the same payout table.

4. A game of chance according to claim 1, wherein at least one of the plurality of levels has a different payout table than a first level.

5. A game of chance according to claim 1, wherein at least one of the plurality of levels has multiple payout tables.

6. A game of chance according to claim 1, wherein a number of the plurality of levels is predetermined.

7. A game of chance according to claim 1, wherein winners of a top winning tier in the final level can win at least one of the group of a standard, a progressive, and a rolling jackpot.

8. A game of chance according to claim 7, wherein winners of the top winning tier in the final level must win a final drawing to win the at least one of the group comprising the standard, the progressive, and the rolling jackpot.

9. A game of chance according to claim 1, wherein only one bet at the start of the game is needed to play.

10. A game of chance according to claim 1, wherein winnings of the game of chance are paid out after each level.

11. A game of chance according to claim 1, wherein winnings of the game of chance are paid out only after the final level.

12. The game according to claim 1, wherein the player may enter into the game of chance after the first level of the plurality of levels by paying a bet greater than an initial bet to play the first level.

13. The game according to claim 1, wherein the player may enter into the game of chance after the first level of the plurality of levels by paying a bet greater than a sum of an initial bet plus any fees or bets required to play any subsequently played levels to get to a level being entered.

14. The game according to claim 1, wherein odds of winning decrease as a level of the plurality of levels increases.

15. The game according to claim 1, wherein the individual payout is increased as a level of the plurality of levels increases.

16. A game of chance according to claim 1, further comprising determining a plurality of winners, wherein the winners are segregated into the plurality of winning tiers based upon the winners' winning outcome.

17. A game of chance according to claim 16, wherein the winners proceed to the next level as a group for each winning tier.

18. A game of chance according to claim 16, wherein each winning tier is provided a different payout table in the next level.

19. A method for operating a game of chance for a plurality of players, the game of chance comprising:

providing for the plurality of players a plurality of levels via a processor, the plurality of levels comprising at a first level, at least one intermediate level, and a final level, each level above the first level comprising a plurality of winning tiers and at least one losing tier, wherein players in the winning tiers advance to a next level;

providing, via the processor, a game at each of the plurality of levels provided by the processor to a player, wherein at least two different games are provided in separate levels of the plurality of levels and are not the same game;

determining at least one winner via the processor, wherein the winner obtains one of a plurality of winning outcomes;

placing the winner into one of the plurality of winning tiers via the processor, wherein the processor determines which winning tier the winner is placed into by segregating the winner from the plurality of players based on at least one type of winning outcome, wherein the winner in one level must play a next level; and providing that at least one of the plurality of levels includes more than one way to win the level.

* * * * *